Oct. 6, 1970         JAMES E. WEBB             3,531,989
        ADMINISTRATOR OF THE NATIONAL AERONAUTICS
                AND SPACE ADMINISTRATION
                TRANSIENT HEAT TRANSFER GAUGE
                     Filed Oct. 5, 1967

INVENTOR.
ALLEN D. WOOD
BY
ATTORNEYS

United States Patent Office 3,531,989
Patented Oct. 6, 1970

3,531,989
TRANSIENT HEAT TRANSFER GAUGE
James E. Webb, Administrator of the National Aeronautics and Space Administration, with respect to an invention of Allen D. Wood, Palo Alto, Calif.
Filed Oct. 5, 1967, Ser. No. 673,229
Int. Cl. G01k 17/00
U.S. Cl. 73—190                                12 Claims

ABSTRACT OF THE DISCLOSURE

A transient heat transfer gauge is described which is capable of measuring total radiant intensity from vacuum ultra-violet and ionized high temperature gases. The gauge includes a thermally thick radiation absorbing metal disc of suffiicent thickness to prevent penetration of photons, having one surface exposed to the radiation and strain sensitive piezoelectric crystal bonded to the opposite surfact. Said disc responds to the radiation heat flux by thermally induced radial strain and the strain sensitive piezoelectric crystal bonded to the opposite surface of the metal disc on sensing the mehanical stress waves propagated through the metal disc develops a charge between the crystal faces proportional to the heat flux.

ORIGIN OF INVENTION

The invention described herein was made in the performance of work under a NASA contract and is subject to the provisions of the Section 305 of the National Aeronautics and Space Act of 1958, Public Law 85–568 (72 Stat. 435; 42 USC 2457).

BACKGROUND OF THE INVENTION

Field of the invention

The present invention relates to a gauge for the measurement of the total radiant intensity from high temperature gases and, more particularly, to a transient heat transfer gauge for measurement of vacuum ultraviolet radiation under adverse environmental conditions.

Description of the prior art

The transfer of energy by radiation is of primary importance in the total heating of a body entering a planetary atmosphere at superorbital flight velocities. It not only determines the radiative heat transfer but can affect the convective heating by radiant transfer between the inviscid and the viscous region of the shock layer. However, measurements of the total radiant intensity from the high temperature gases in this or similar environments is difficult because of photoelectric, photoconductive and photoionization effects on presently available gauges caused by the inherent vacuum ultraviolet, or "VUV," radiation and ionized plasmas. These effects make most radiant energy detectors useless for such measurements and because of the lack of suitable instrumentation, this important region has received only minimal experimental investigation.

For example, platinum on quartz thin film gauges are quite acceptable when utilized behind a quartz window which is an ultraviolet absorber. But by the very nature of these gauges, they must present a voltage gradient along the surface exposed to the radiation. When the window is removed, the VUV radiation photoionizes any gas near the gage, and thus the platinum resistive element is shorted. In this condition, the gage is useless for quantitative measurements.

However, the VUV region must be included in a total radiation intensity measurement because over half of the total intensity can occur at wavelengths below 1200 angstroms and thus there can be no window between the hot gas and the detector surface.

The inherent limitations of the thin film gauge might be avoided with a detector that presents a constant potential along the heated surface and a supposedly attractive example of this type of thermal detector is a pyroelectric gauge. However, the face electrode pyroelectric gauges, when utilized in the adverse environments under consideration, were found to suffer from noise caused by VUV photon penetration of the surface electrodes and depolarization of the sensor crystal.

It is therefore an object of the invention to provide a gauge for the measurement of the total radiant intensity from high temperature gases which is not affected by photoelectric, photoconductive and photoionization effects.

It is a further object of the invention to provide an energy detector for the measurement of vacuum ultraviolet radiation at high stagnation temperatures having a microsecond detector response time.

Yet another object of the invention is the provision of a true energy detector with a spectral energy response limited only by surface absorbtance.

A still further object of the invention is to provide an energy detector which will yield a satisfactory resopnse in the presence of all effects caused by vacuum ultraviolet radiation but yet possess a response time of 2 microseconds or less, including the thermal lag of surface energy collectors.

These and other objects and advantages of he invention will become apparent as the description proceeds.

SUMMARY OF THE INVENTION

The energy detector of the invention is based on the fact that mechanical stress waves travel through a medium many times faster than thermal waves and the gauge of the invention, rather than measuring thermal energy directly, measures the thermal strain induced in a thermally thick material in response to surface heating phenomena. In contrast, the thin film and the pyroelectric gauges measure thermal energy directly, and thus any protective layer applied to the surface must be thermally thin on the time scale of interest to maintain an acceptable time response. Furthermore, when a microsecond time response is required, such layers must be quite thin, and deposition of such films is a very difficult and uncertain procedure.

A thermal strain caused by the heat flux on the heated surface of the thermally thick material is sensed by a strain sensitive sensing means coupled to the thermally thick material. A signal is developed in the sensor material which is proportional to the magnitude of the surface heat flux. A principal advantage of the transient heat transfer gauge of the invention is that the sensitive strain measuring element is located on the back unheated side of the thermally-thick material, and this sensitve element is thus completely isolated from any ionized flow and/or VUV irradiation and thus is isolated from the deleterious effects thereof.

BRIEF DESCRIPTION OF THE DRAWINGS

The invention will become better understood by reference to the following detailed description when considered in connection with the accompanying drawings wherein:

Referring now to FIGS. 1 and 2, the transient heat transfer gauge includes a relatively thick silver metal disc 6 having an energy absorbing aluminum black coating 8 on its exterior surface and a strain sensing crystal 10 bonded to its inner surface by a soldered connection at 12. The bottom electrode face 14 of the crystal 10 is connected to electrical lead 16 by solder 18. The outer other electrode face of the crystal is connected through the metal disc and the housing 20 to ground. The electrodes are insulated, and the structure given mechanical rigidity by means of an insulating potting compound 22 bonding the elements of the gauge together. The lower edge of the metal disc 6 is supported on the housing 20 but is free to expand in a radial direction to avoid cupping of the surface on thermal expansion.

Figure 1:
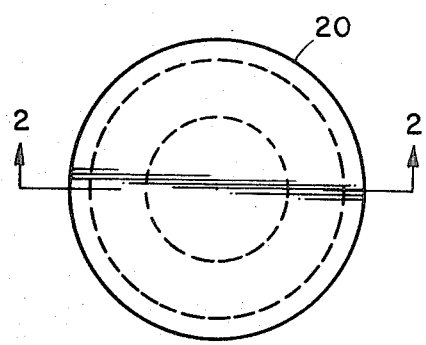
FIG. 1 is a top view of a first embodiment of a transient heat transfer gauge of the invention.

Surface heating $q(t)$ caused by radiation absorbed on the aluminum black coating, causes a thermally induced strain of the metal disc proportional to the magnitude of the heat flux resulting in a radial expansion of the metal disc which is transmitted rapidly to the strain sensing crystal whose polarization vector is normal to the strain direction resulting in an electrical charge proportional to the heat flux being developed between the crystal electrode faces.

The environment under consideration, i.e., air plasmas at 10,000° K. and higher, contains extremely energetic 14 to 16 e.v. VUV photons. The metal disc must be relatively thick to block and absorb these photons. A silver disc about 0.005 inch thick satisfactorily absorbs these photons in the gauge of the invention. Such a disc is relatively thermally thick on a microsecond scale, i.e., it requires over a microsecond for thermal wave to move from the outer face to the inner face of the metal disc. However, since the gauge of the invention relies on the propagation of strain waves which travel at the speed of sound on the order of one microsecond rather than the movement of heat waves which move much slower, e.g., 500 microseconds, metal strain inducing layers can be 500 times thicker than heat responsive layers with comparable time constants and yet with little loss in sensitivity. The construction of gauges according to the invention is far simpler than deposition of thin films only a few molecular layers thick. Various other materials can be utilized as the strain applying material, the thickness depending upon the photon capture properties of the material. Conducting metals are preferred, since the bottom face of the disc can then be used as an electrode junction.

For these same reasons, the energy absorbing layer should however be thermally thin and should have a very high spectrally uniform surface absorptance of at least 0.90, and preferably at least 0.98, over as wide a spectral range as possible. Aluminum black can be vacuum deposited to provide a spectrally uniform film having a surface absorptance of 0.98 ± 0.01 measured over the range of 0.27 to 1.8 microns. Though there are materials such as carbon black, camphor black or various black lacquers whose spectral response is governed only by the absorptance of their heated surface, it is preferred to use metal blacks such as aluminum black, gold black or platinum black because of the microsecond time response permissible with these materials.

The strain sensing crystal located on the back, unexposed surface of the disc senses the thermal strain to provide an output proportional to the energy absorbed at the gauge surface. Various piezoelectric ceramics are particularly useful strain sensing and measuring materials since, when bonded to the metal disc, they develop, when strained, a directional voltage output between the faces of the crystal proportional to the total energy absorbed on the exposed metal surface. It is preferred that the crystal material have a fairly high curie temperature so that the gauge can be manufactured by soldering without loss of piezoelectric properties and the gauge can be positioned in high temperature environment during measurement. Ferroelectric ceramics, such as barium titanate, or lead zirconate-lead-titanate, are suitable ceramics for constructing the gauges of the invention and are inexpensive, stable and readily available in convenient shapes and sizes. The Curie temperature of lead zirconate-lead-titanate ceramics such as PZT–5A (Clevite Corporation) is about 400° C. so any solder melting near but below 400° C. such as lead-tin solders can be utilized in bonding the ceramic to the metal disc. Indium solders can be utilized for bonding of lower Curie temperature materials.

The configuration of the sensor does not influence the ability to measure successfully total radiant intensity and the strain generating metal disc and strain sensing crystal may be rectangular, circular or polygonal. However, it is desirable to keep the sensor small so that the natural frequency of the crystal is sufficiently high so as not to enter into or effect the measurements.

The encapsulation of the crystal and the rear surface of the thermally thick metal disc also serves to dampen resonant vibrations. It is thus preferred that the potting compound be nonelastomeric and set to a rigid state as is the case with various commercial epoxy materials. The potting compound also serves to insulate the electrode faces of the crystal. The design of the gauge of the invention results in a rugged and durable device capable of use and abuse in adverse environments without even changing the calibration constant since the relatively thick metal film protects the crystal from the adverse environment on the front exposed face while the sensitive strain measuring element on the back unheated side of the thick disc is completely encased by a protective filler of epoxy and is further housed in a metal housing which completes the isolation of the crystal from the effect of ion flow and/or VUV irradiation.

The electrical equivalent circuit of the transient heat transfer gauge of the invention consists of a current or charge generator in parallel with an internal resistance $R_T$ and capacitance $C_T$. The gauge is loaded by an external circuit (cables, amplifier input impedance, etc.) which is characterized by a parallel resistance $R_L$ and capacitance $C_L$. By denoting the parallel combination of the resistances and capacitances by $R'$ and $C'$ the output voltage has the following limiting forms:

Long Time Constant (TC) Case $(R'C' \gg t_{max})$ $$V(t) = K\frac{C_T}{C'}\int_0^t q(\lambda)d\lambda$$

Short Time Constant Case $(R'C' < t_{min})$ $$V(t) = KR'C_T q(t)$$

where $q(t)$ is the heat flux absorbed on the surface, $t_{max}$ is the largest observation time required while $t_{min}$ is the minimum resolution time required. The two types of output voltage obtainable, i.e. long and short TC, allow one a choice between fidelity to the heat flux input and voltage sensitivity. This choice is obtained directly and without the complication introduced by differentiating circuits. Thus, the gauges of the invention can either integrate a heat pulse or with some cases of signal follow it directly by merely changing the time constant of the external circuit.

Figure 5:
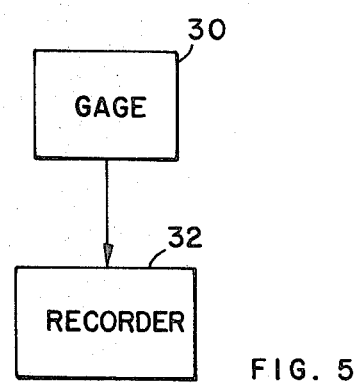
FIG. 5 is a block diagram of a total radiant intensity measurement system according to the invention.

Referring now to FIG. 5, the output from the transient heat transfer gauge 30 is delivered to a voltage-time recording or display device 32 such as an oscilloscope which can be directly connected to its terminals.

Figure 2:
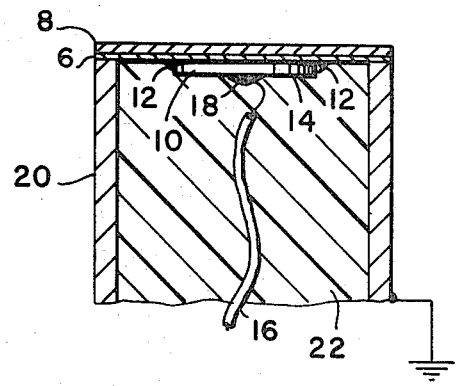
FIG. 2 is a cross-sectional view taken along the line 2—2 of FIG. 1.

A gauge constructed according to FIGS. 1 and 2, including a thermally thin aluminum black energy receptor coating deposited onto a 0.005 inch thick silver disc bonded to a PZT 5A crystal was calibrated in the long and short TC modes by exposure to a chopped and calibrated pulse input at a chopping rate of 120 Hz. and a pulse duration of 1 msec. The long TC mode was obtained by connecting the gauge with a driven-shield cable ($C_L$ negligible) to a high input impedance cathode amplifier while the short TC mode was obtained by shunting with a 150 KΩ (TC=~40 μsec) resistor. Calibration constants between 50 to 75 V-$^2$/W-sec have been found for gauges of this construction. Either mode yields essentially the same calibration constant. The time response of the gauge was tested by shunting with a 1.5 KΩ ($TC$=~0.4 μsec.) resistor and exposing the gauge of a 15 μsec. light pulse from a Xenon flash tube driven by a lumped parameter delay line. The time response was about 2 μsec. which is quite good and the output closely agreed with a photomultiplier trace. The time response test verified that the aluminum black coating was sufficiently thermally-thin.

Figure 3:
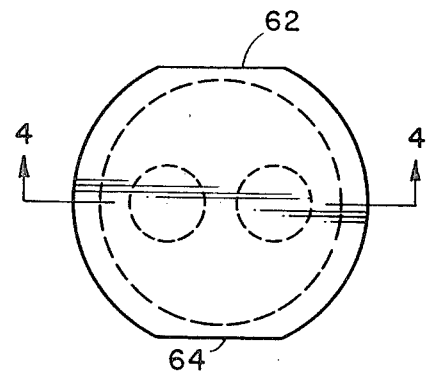
FIG. 3 is a top view of a preferred embodiment of a differential operation transient heat transfer gauge having an increased output.
Figure 4:
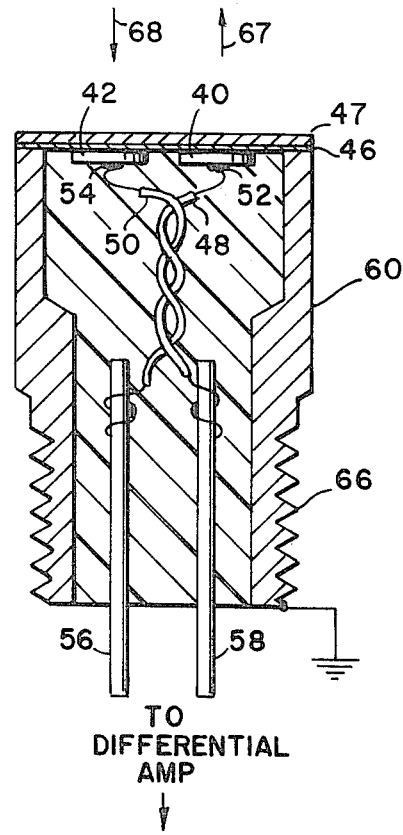
FIG. 4 is a cross-sectional view taken along the line 4—4 of FIG. 3.

The directional nature of the piezoelectric charge makes the gauge ideally suited for differential operation with a doubled output. As shown in FIGS. 3 and 4, the two crystal elements 40 and 42 are installed with the polarization vectors 67, 68 in opposite directions so that the two heat flux signals (A and B) are out of phase. Most noise pickup will be in phase so that feeding the signals to a differential amplifier whose output is proportional to A minus B results in a cancellation of common mode noise while doubling the desired heat flux signal. The calibration constant, K, in this gauge is found to be doubled to about 100 to 150 v.-cm.$^2$/W-sec. utilizing two 0.10 inch diameter, 0.010 inch thick PZT-5A elements.

In this embodiment, the crystals are sweat soldered to a 0.005 inch thick silver disc 46 having a thermally thin aluminum black coating 47. Electrode leads 48 and 50 are soldered to the crystals at 52 and 54 and are each connected to A and B prong terminals 56 and 58, respectively. The interior of the housing 60 is filled with epoxy potting compound. The housing contains flattened sides, 62, 64, along the forward face to facilitate installation into a testing chamber and threads 66 to engage a mating connector.

Basically, the heat gauges of the invention respond to the net change in internal energy of the sensing element in a time of the order of tenths of microseconds. Eventually, in about 20 msec. for the design of the illustrated embodiments, thermal losses become appreciable and cause the output to decrease. However, this does not effect the use of this gauge in measurements of transient heat fluxes occurring in a shorter time. It can be further experimentally shown that the response of the transient heat transfer gauges is not caused by a direct thermal effect such as pyroelectricity. When the temperature history of a composite silver on infinite PZT–5A crystal is compared to the time scale of the gauge, after 15 μsec. the interface surface temperature ratio is only 6% whereas the gauge of the invention fully responds in about one microsecond or less. The gauge responds to the energy absorbed by creating transient travelling stress waves in the crystal rather than changes in steady, standing waves. Since the gauge operation does not require a state of thermal equilibrium in the metal layer, there are no minimum thermal coefficient of expansion of the metal, nor any relation between this coefficient and that of the crystal.

The gauge of the embodiments being based on an anisotropic crystal material, exhibits an unwanted pressure response which can be eliminated by housing the gauge in a cavity during measurement to isolate it from the pressure and vibration effects of plasmas.

The total radiant intensity of 10,000 to 15,000° K. air plasmas was measured in the reflected shock region of a 12-inch diameter, arc-driven shock tube with the gauge of the invention supported in a cavity viewing the radiation through a small windowless aperture located flush with the inside wall of the shock tube.

The gauge is preferably operated in the short time contant mode when used in shock tube experiments because of the greater fidelity to possible temporal variations of the surface heat flux. However, for measurements at the lower incident shock velocities where the magnitude of the radiation was low, it was necessary to utilize the higher sensitivity available with long TC mode. The gauge operated satisfactorily in the adverse environment and either operational mode yielded the same results. The total intensity radiation results agree very well with theoretical predictions for radiant intensity at various gas path lengths obtained by a spectral evaluation of the radiant energy transport equation which predicts that over half the total intensity would lie in the vacuum ultraviolet at wavelenghs below 1200 A. Thus, over half the radiation would not be measured when windows are utilized since the VUV wavelengths are below the transmission limits of the window materials.

The gauges respond quite well until the inflow strikes the gauge surface and obliterates the radiative signal by a higher rate of convective heating. This does not harm the gauges which have been used for over sixty shots without any substantial change in their calibration constants.

The pressure response of the gauge can be minimized or controlled by other means. Anisotropic piezoelectric ceramics respond quite differently to strains in the polarization direction as opposed to those normal to this direction. The thermally-induced strains of the transient heat temperature gauge are essentially radial while pressure-induced strains would be predominantly normal to the heated surface. Thus the pressure response can be minimized by proper design of the gauge.

Advantage can also be taken of the difference between pressure and thermally induced strains. During a convective heat transfer situation the simultaneously applied step function of a pressure induced strain would quickly equilibrate while the thermally induced strain would continuously increase. The pressure response could be eliminated in the data reduction procedure or it may even be possible to simultaneously measure both pressure and heat transfer with the same gauge and thus exploit the pressure response rather than minimize it.

It is to be understood that the foregoing description only relates to preferred embodiments of the invention and that numerous substitutions, alterations and modifications are permissible without departing from the spirit and scope of the invention as defined in the following claims.

What is claimed is:

1. A total radiant energy detector comprising in combination:
    a metallic energy receptor element for responding to absorbed radiation by propagating mechanical stress waves therethrough, said element having an exposed radiation heat flux absorptance surface, a rear surface and having a thermal thickness requiring over one microsecond for propagation of thermal waves from said exposed surface to said rear surface and a thickness sufficient to block and absorb photons having an energy of at least 14 ev.;
    sensing means responsive to said stress waves coupled to the rear surface of the receptor element for sensing said stress waves and for developing an output signal indicative thereof; and
    measuring means operatively connected to said sensing means for developing an output signal proportional to the surface heat flux.

2. A transient heat transfer gauge for measuring total radiant intensity from an environment containing photons having an energy of at least 14 ev. comprising:
    a thermally thick conducting metal disc having a front total radiant energy absorptance surface and a rear surface, said disc having a thickness sufficient to block and absorb said photons and a thermal thickness requiring over one microsecond for propagation of thermal waves between said surfaces;

at least one piezoelectric ceramic wafer bonded to the rear surface of the metal disc in a direction normal to the polarization axis;

rigid filler means for encasing the side and rear surfaces of the ceramic wafer for damping resonant vibrations of said wafer;

electrode means operatively connected to the rear surface of the ceramic wafer and to said disc; and means coupled to said electrodes for recording the output thereof.

3. A transient heat gauge according to claim 2 in which two crystals are bonded to the metal disc in opposite polarization directions.

4. A transient heat transfer gauge for measuring the total radiant intensity from high-temperature and/or ionized gases containing photons having an energy of at least 14 ev. and having a microsecond detector time response comprising:

a thermally thick conducting metal disc having a front total radiant energy absorbtance surface and a rear surface, said disc having a thickness sufficient to block and absorb said photons and a thermal thickness requiring over one microsecond for propagation of thermal waves between said surfaces;

at least on piezoelectric ceramic disc bonded to the rear surface of the metal disc on a plane surface normal to the polarization axis;

a metal housing supporting said metal disc and extending beyond said ceramic disc;

electrode means operatively connected to the rear surface of the ceramic disc and to said housing;

a hardened, rigid potting compound filling said housing; and means coupled to said electrode means for recording the output thereof.

5. A total radiation intensity device capable of sensing highly energetic vacuum ultraviolet radiation containing photons having energies of at least 14 ev. comprising:

a piezoelectric crystal having two faces;

a thermally thick metal disc having a sufficient thickness to totally absorb said radiation and a thermal thickness requiring over one microsecond for propagation of thermal waves between said surfaces, said disc being bonded to a face of the crystal in a direction normal to the polarization vector; and electrode means operatively connected to each face of the crystal.

6. A device according to claim 5 in which the piezoelectric crystal is a ferroelectric material.

7. A device according to claim 6 in which the crystal comprises lead zirconate-lead titanate.

8. A device according to claim 5 in which the outside surface of the metal disc is blackened.

9. A device according to claim 8 in which the surface is blackened with a thermally thin coating of aluminum black.

10. A device according to claim 5 in which the metal disc comprises silver.

11. A device according to claim 10 in which the silver disc is about 0.005 inch thick.

12. A method of measuring the total radiant intensity of vacuum ultraviolet radiation containing photons having energies of at least 14 ev. comprising the steps of:

absorbing the radiation on one face of a metal disc to cause a thermally induced radial strain of the disc said disc being sufficiently thick to prevent penetration of said radiation to the rear face thereof and having a thermal thickness requiring over one microsecond for propagation of thermal waves between said faces;

communicating this strain to a strain-sensitive piezoelectric crystal coupled to the rear face of the disc to develop an electrical charge between the faces of the crystal proportional to the heat flux on the surface of the disc; and measuring this charge.

References Cited

UNITED STATES PATENTS

| | | | |
|---|---|---|---|
| 3,065,345 | 11/1962 | Clerc | 250—83.1 |
| 3,200,271 | 8/1965 | Haines | 310—8.5 |
| 3,225,196 | 12/1965 | Gigon et al. | 250—83.1 |

JAMES J. GILL, Primary Examiner

H. GOLDSTEIN, Assistant Examiner

U.S. Cl. X.R.

250—83.3